United States Patent
Letko et al.

(10) Patent No.: US 12,202,928 B2
(45) Date of Patent: Jan. 21, 2025

(54) ISOCYANATE REACTIVE COMPOSITIONS

(71) Applicant: Dow Global Technologies LLC, Midland, MI (US)

(72) Inventors: Christopher S. Letko, Lake Jackson, TX (US); Weijun Zhou, Lake Jackson, TX (US); Thomas P. Willumstad, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 722 days.

(21) Appl. No.: 17/426,722

(22) PCT Filed: Jan. 30, 2020

(86) PCT No.: PCT/US2020/015788
§ 371 (c)(1),
(2) Date: Jul. 29, 2021

(87) PCT Pub. No.: WO2020/160206
PCT Pub. Date: Aug. 6, 2020

(65) Prior Publication Data
US 2022/0098358 A1   Mar. 31, 2022

Related U.S. Application Data

(60) Provisional application No. 62/799,152, filed on Jan. 31, 2019.

(51) Int. Cl.
| | | |
|---|---|---|
| *C08G 18/48* | (2006.01) | |
| *C08G 18/32* | (2006.01) | |
| *C08G 18/40* | (2006.01) | |
| *C08G 18/42* | (2006.01) | |
| *C08G 18/66* | (2006.01) | |
| *C08G 18/76* | (2006.01) | |
| *C08J 9/14* | (2006.01) | |

(52) U.S. Cl.
CPC ..... *C08G 18/4816* (2013.01); *C08G 18/3215* (2013.01); *C08G 18/4018* (2013.01); *C08G 18/4219* (2013.01); *C08G 18/4829* (2013.01); *C08G 18/4879* (2013.01); *C08G 18/6611* (2013.01); *C08G 18/7664* (2013.01); *C08J 9/141* (2013.01); *C08G 2110/0025* (2021.01); *C08G 2110/005* (2021.01); *C08J 2203/14* (2013.01); *C08J 2375/06* (2013.01); *C08J 2375/08* (2013.01)

(58) Field of Classification Search
CPC ............ C08G 18/3215; C08G 18/4018; C08G 18/4219; C08G 18/4816; C08G 18/4829; C08G 18/4879; C08G 18/6611; C08G 18/7664; C08G 2110/0025; C08G 2110/005; C08J 9/141; C08J 2203/14; C08J 2375/06; C08J 2375/08
See application file for complete search history.

(56) References Cited

U.S. PATENT DOCUMENTS

| | | | |
|---|---|---|---|
| 5,824,714 A | 10/1998 | Broennum et al. | |
| 7,097,669 B2 | 8/2006 | Stephens et al. | |
| 9,708,448 B2 | 7/2017 | Masy et al. | |
| 2003/0100623 A1* | 5/2003 | Kaku | C08G 18/6674 528/425 |
| 2004/0217376 A1 | 11/2004 | Ahsan et al. | |
| 2006/0052467 A1 | 3/2006 | Pignagnoli et al. | |
| 2014/0206786 A1 | 7/2014 | Xu et al. | |
| 2018/0066100 A1 | 3/2018 | Menon et al. | |

FOREIGN PATENT DOCUMENTS

GB   1358519   7/1974

OTHER PUBLICATIONS

International Search Report & Written Opinion for related PCT Application PCT/US2020/015788, mailed May 19, 2020 (14 pgs).
International Preliminary Report on Patentability for related PCT Application PCT/US2020/015788, mailed Aug. 12, 2021 (9 pgs).
Huang, et al., "Synthesis and Application of Hyperbranched Polyethers"; Polymer Bulletin, vol. 10 (Jan. 15, 2010) (9 pgs) (Original Document ONLY Available w/ English Abstract).
Wang, et al., Isolation and Structure Elucidation of Low Molecular Weight Components of Aurintricarboxylic Acid (ATA); Journal of Organic Chemistry, vol. 57, No. 14 (1992) (6 pgs).
Feng, et al., "Novel Trivalent Anti-Influenza Reagent"; Bioorganic & Medicinal Chemistry Letters, vol. 20 (Apr. 18, 2010) (5 pgs).

* cited by examiner

*Primary Examiner* — John M Cooney

(57) ABSTRACT

Embodiments of the present disclosure are directed towards isocyanate reactive compositions that include a polyol and tris(4-hydroxyphenyl)methane alkoxylate.

3 Claims, No Drawings

ISOCYANATE REACTIVE COMPOSITIONS

This application is a National Stage Application under 35 U.S.C. § 371 of International Application Number PCT/US2020/015788, filed Jan. 30, 2020 and published as WO 2020/160206 on Aug. 6, 2020, which claims the benefit to U.S. Provisional Application 62/799,152, filed Jan. 31, 2019, the entire contents of which are incorporated herein by reference in its entirety

FIELD OF DISCLOSURE

Embodiments of the present disclosure are directed towards isocyanate reactive compositions, more specifically, embodiments are directed towards isocyanate reactive compositions that include a polyol and tris(4-hydroxyphenyl) methane alkoxylate.

BACKGROUND

Cured materials may be utilized for a number of applications. For some applications, cured materials having one or more improved fire resistance properties are desired. There is continued focus in the industry on developing new and improved curable materials.

SUMMARY

The present disclosure provides isocyanate reactive compositions including a polyol; and tris(4-hydroxyphenyl) methane alkoxylate, wherein the polyol is from 25 to 95 parts of the isocyanate reactive composition based upon 100 parts of a combination of the polyol and the tris(4-hydroxyphenyl)methane alkoxylate, and the tris(4-hydroxyphenyl) methane alkoxylate is from 5 to 75 parts of the isocyanate reactive composition based upon 100 parts of the combination of the polyol and the tris(4-hydroxyphenyl)methane alkoxylate.

The present disclosure provides cured products formed from curing the isocyanate reactive compositions.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Isocyanate reactive compositions are disclosed herein. The isocyanate reactive compositions include a polyol and tris(4-hydroxyphenyl)methane alkoxylate. Advantageously, utilizing the tris(4-hydroxyphenyl)methane alkoxylate in the isocyanate reactive compositions can provide one or more improved fire resistance properties for cured products formed from the isocyanate reactive compositions disclosed herein. For instance, a cured product formed from the isocyanate reactive compositions disclosed herein may have an improved, i.e. lower, peak heat release rate; an improved, i.e. lower, total heat release; an improved, i.e. lower, mass loss; and/or a desirable combination of limiting oxygen index and glass transition temperature.

Surprisingly, utilizing tris(4-hydroxyphenyl)methane alkoxylate can help to provide the one or more improved fire resistance properties, as compared to cured products that are formed with other aromatic phenol compounds, such as bisphenol A derived compounds, even when the compared cured products have similar aromatic group contents.

While not wishing to be bound to theory, one or more of the improved fire resistance properties may indicate an unexpected dependence of the substitution pattern around the aromatic rings of the alkoxylate for fire resistance properties, rather than an overall aromatic content of the cured product. Further, including the tris(4-hydroxyphenyl) methane alkoxylate provides that a 3-functional, aromatic compound is utilized. In contrast to the tris(4-hydroxyphenyl)methane alkoxylate, typically utilized polyether polyols albeit having higher functionality do not contain aromatic groups, whereas typically utilized polyester polyols containing aromatic groups generally have an average functionality of 2.4 or less. In the case of aromatic polyester polyols, higher functionality polyols can be prepared, but tend to exhibit very high viscosity, presenting practical challenges for foam processing, for instance. The relative greater functionally and/or the presence of aromatic groups of the tris(4-hydroxyphenyl)methane alkoxylate may advantageously help provide for relatively greater crosslinking, which may be evidenced by relatively higher glass transition temperatures and/or and an improved dimensional stability of cured products, e.g., fabricated articles.

As mentioned, the isocyanate reactive compositions disclosed herein include tris(4-hydroxyphenyl)methane alkoxylate, which may be referred to as TPM alkoxylate. One or more embodiments provide that tris(4-hydroxyphenyl)methane alkoxylate is an ethoxylate, e.g., tris(4-hydroxyphenyl)methane ethoxylate. Tris(4-hydroxyphenyl) methane ethoxylate may be represented by the following Formula I:

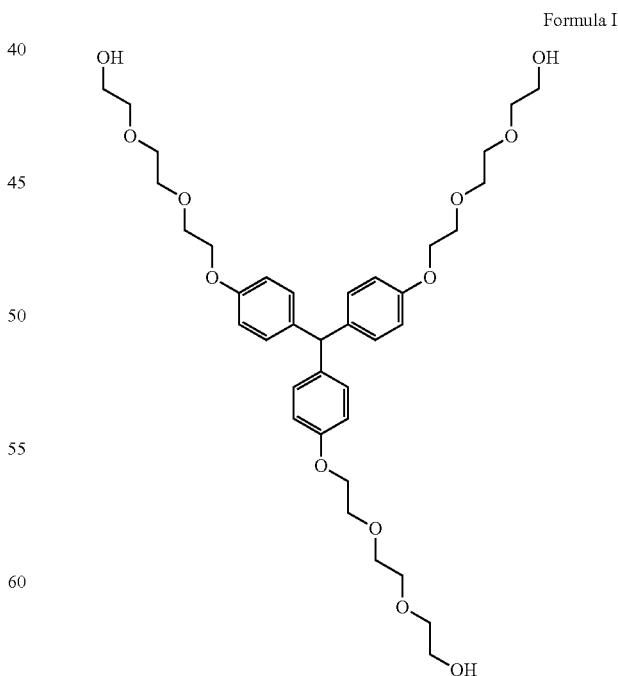

Formula I

As an example, tris(4-hydroxyphenyl)methane ethoxylate may be formed by the following synthesis:

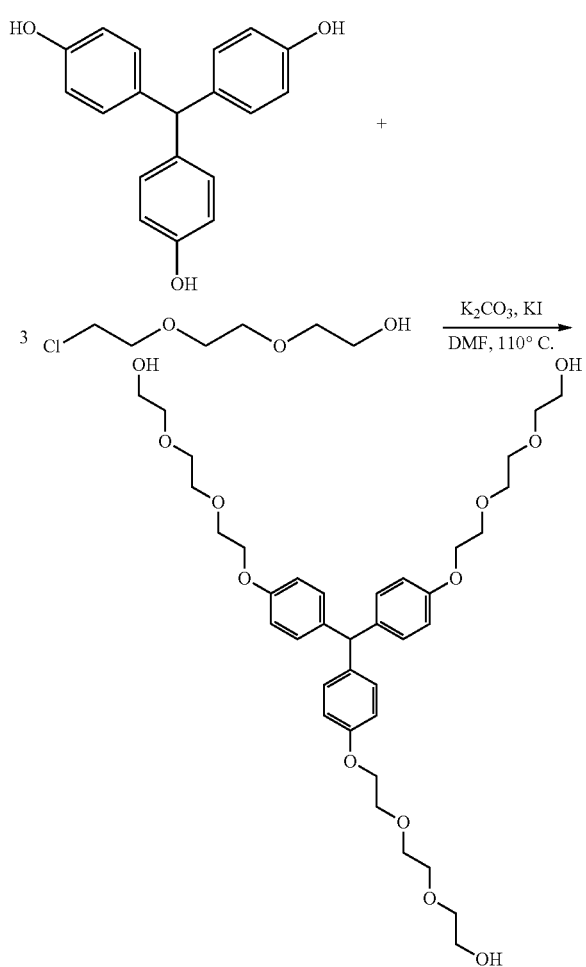

Synthesis of tris(4-hydroxyphenyl)methane ethoxylate is also discussed in Feng, F. et al. Bioorg. Med. Chem. Lett. 2010, 20, 3772, for instance.

The tris(4-hydroxyphenyl)methane alkoxylate can be from 5 to 75 parts of the isocyanate reactive composition based upon 100 parts of a combination of the polyol and the tris(4-hydroxyphenyl)methane alkoxylate. All individual values and subranges from 5 to 75 parts are included; for example, the tris(4-hydroxyphenyl)methane alkoxylate can be from a lower limit of 5, 7.5, or 10 parts of the isocyanate reactive composition based upon 100 parts of a combination of the polyol and the tris(4-hydroxyphenyl)methane alkoxylate to an upper limit of 75, 65, or 50 parts of the isocyanate reactive composition based upon 100 parts of the combination of the polyol and the tris(4-hydroxyphenyl)methane alkoxylate.

Advantageously, utilizing tris(4-hydroxyphenyl)methane alkoxylate can help to provide that the isocyanate reactive compositions disclosed herein have a desirable aromatic group content, which may help to provide that cured products formed from the isocyanate reactive compositions have one or more improved fire resistance properties. Aromatic group content of a compound can be determined by dividing the total molecular weight of aromatic rings in a given compound by the compound's overall molecular weight; aromatic group content of a composition can be determined by dividing the weighted average of aromatic group contents for each compound in a given composition by the composition's overall weight. As used herein "aromatic group content" refers to theoretical, e.g., calculated, aromatic group content. Embodiments of the present disclosure provide that the isocyanate reactive composition has an aromatic group content from 10 to 35 weight percent based upon a total weight of the polyol and the tris(4-hydroxyphenyl)methane alkoxylate. All individual values and subranges from 10 to 35 weight percent are included; for example, the isocyanate reactive composition can have an aromatic group content from a lower limit of 10, 15, or 20 weight percent to an upper limit of 35, 30, or 25 weight percent based upon the total weight of the polyol and the tris(4-hydroxyphenyl)methane alkoxylate.

As mentioned, the isocyanate reactive compositions disclosed herein include a polyol. As used herein, "polyol" refers to a molecule having an average of greater than 1.0 hydroxyl groups per molecule. Various polyols may be utilized for the isocyanate reactive compositions. Examples of polyols include, but are not limited to a polyester polyols, polyether polyols, polycarbonate polyols, and combinations thereof.

As used herein, "a," "an," "the," "at least one," and "one or more" may be used interchangeably unless indicated otherwise. The term "and/or" means one, one or more, or all of the listed items. The recitations of numerical ranges by endpoints include all numbers subsumed within that range, e.g., 1 to 5 includes 1, 1.5, 2, 2.75, 3, 3.80, 4, 5, etc.

Polyester polyols may be prepared from, for example, organic dicarboxylic acids having from 2 to 12 carbon atoms, including aromatic dicarboxylic acids having from 8 to 12 carbon atoms and polyhydric alcohols, including diols and triols having from 2 to 12 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomeric naphthalene-dicarboxylic acids. The dicarboxylic acids may be used either individually or mixed with one another. Free dicarboxylic acids may be replaced by a corresponding dicarboxylic acid derivative, for example, dicarboxylic esters of alcohols having 1 to 4 carbon atoms or dicarboxylic anhydrides. Some particular examples may utilize dicarboxylic acid mixtures including succinic acid, glutaric acid and adipic acid in ratios of, for instance, from 20 to 35:35 to 50:20 to 32 parts by weight, and adipic acid, and mixtures of phthalic acid and/or phthalic anhydride and adipic acid, mixtures of phthalic acid or phthalic anhydride, isophthalic acid and adipic acid or dicarboxylic acid mixtures of succinic acid, glutaric acid and adipic acid and mixtures of terephthalic acid and adipic acid or dicarboxylic acid mixtures of succinic acid, glutaric acid and adipic acid. Examples of dihydric and polyhydric alcohols are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane, among others. Some particular examples provide that ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. Furthermore, polyester polyols made from lactones, e.g., ε-caprolactone or hydroxycarboxylic acids, e.g., ω-hydroxycaproic acid and hydrobenzoic acid, may also be employed.

Some embodiments of the present disclosure provide that polyester polyols may be prepared by polycondensing the organic, e.g., aliphatic and preferably aromatic polycarboxylic acids and mixtures of aromatic and aliphatic polycarboxylic acids, and/or derivatives thereof, and polyhydric alcohols without using a catalyst or in the presence of an esterification catalyst, in an inert gas atmosphere, e.g., nitrogen, carbon monoxide, helium, argon, inter alia, in the melt at from about 150 to about 250° C., at atmospheric pressure or under reduced pressure until a desired acid number, which can be less than 10, e.g., less than 2, is reached. Some embodiments of the present disclosure provide that the esterification mixture is polycondensed at the above mentioned temperatures under atmospheric pressure and subsequently under a pressure of less than 500 millibar, e.g., from 50 to 150 mbar, until an acid number of from 80 to 30, e.g., from 40 to 30, has been reached. Examples of suitable esterification catalysts include, but are not limited to, iron, cadmium, cobalt, lead, zinc, antimony, magnesium, titanium and tin catalysts in the form of metals, metal oxides or metal salts. Polycondensation may also be carried out in a liquid phase in the presence of diluents and/or entrainers, e.g., benzene, toluene, xylene or chlorobenzene, for removal of the water of condensation by azeotropic distillation, for instance.

Polyester polyols can be prepared by polycondensing organic polycarboxylic acids and/or derivatives thereof with polyhydric alcohols in a molar ratio of carboxylic acid group to hydroxyl group from 1:1.1 to 1:4, e.g., from 1:1.2 to 1:3, or from 1:1.5 to 1:2.5, for instance.

Anionic polymerization may be utilized, e.g., when preparing polyether polyols. For instance, alkali metal hydroxides such as sodium hydroxide or potassium hydroxide, or alkali metal alkoxides, such as sodium methoxide, sodium ethoxide, potassium ethoxide or potassium isopropoxide as catalyst and with addition of at least one initiator molecule containing from 2 to 8 reactive hydrogen atoms in bound form or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety may be utilized.

Examples of suitable alkylene oxides include, but are not limited to, tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other, or as mixtures. Examples of suitable initiator molecules include, but are not limited to, water, organic dicarboxylic acids such as succinic acid, adipic acid, phthalic acid and terephthalic acid, and a variety of amines, including but not limited to aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylene-diamine, 1,3- and 1,4-butylene diamine, 1,2-, 1,3-, 1,4-, 1,5- and 1,6-hexamethylenediamine, aniline, cyclohexanediamine, phenylenediamines, 2,3-, 2,4-, 3,4- and 2,6-tolylenediamine and 4,4'-, 2,4'- and 2,2'-diaminodiphenylmethane. Other suitable initiator molecules include alkanolamines, e.g., ethanolamine, N-methyl- and N-ethylethanolamine, dialkanolamines, e.g., diethanolamine, N-methyl- and N-ethyldiethanolamine, and trialkanolamines, e.g., triethanolamine, and ammonia, and polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose, polyhydric phenols, for example, 4,4'-dihydroxydiphenylmethane and 4,4'-dihydroxy-2,2-diphenylpropane, resols, for example, oligomeric products of the condensation of phenol and formaldehyde, and Mannich condensates of phenols, formaldehyde and dialkanolamines, and melamine.

One or more embodiments of the present disclosure provide that the polyol can include polyether polyols prepared by anionic polyaddition of at least one alkylene oxide, e.g., ethylene oxide or 1,2-propylene oxide or 1,2-propylene oxide and ethylene oxide, onto, as initiator molecule, at least one aromatic compound containing at least two reactive hydrogen atoms and containing at least one hydroxyl, amino and/or carboxyl group. Examples of initiator molecules include aromatic polycarboxylic acids, for example, hemimellitic acid, trimellitic acid, trimesic acid and preferably phthalic acid, isophthalic acid and terephthalic acid, or mixtures of at least two polycarboxylic acids, hydroxycarboxylic acids, for example, salicylic acid, p- and m-hydroxybenzoic acid and gallic acid, aminocarboxylic acids, for example, anthranilic acid, m- and p-aminobenzoic acid, polyphenols, for example, resorcinol, and according to one or more embodiments of the present disclosure, dihydroxydiphenylmethanes and dihydroxy-2,2-diphenylpropanes, Mannich condensates of phenols, formaldehyde and dialkanolamine, preferably diethanolamine, and aromatic polyamines, for example, 1,2-, 1,3- and 1,4-phenylenediamine, e.g., 2,3-, 2,4-, 3,4- and 2,6-tolylenediamine, 4,4'-, 2,4'- and 2,2'-diamino-diphenylmethane, polyphenyl-polymethylene-polyamines, mixtures of diamino-diphenyl-methanes and polyphenyl-polymethylene-polyamines, as formed, for example, by condensation of aniline with formaldehyde, and mixtures of at least two polyamines.

Examples of hydroxyl-containing polyacetals include compounds which may be prepared from glycols, such as diethylene glycol, triethylene glycol, 4,4'-dihydroxyethoxy-diphenyldimethylmethane, hexanediol and formaldehyde. Suitable polyacetals can also be prepared by polymerizing cyclic acetals.

Examples of hydroxyl-containing polycarbonates can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g., diphenyl carbonate, or phosgene.

Commercially available polyols may be utilized. Examples of commercially available polyols include, but are not limited to, polyols under the trade names VORANOL™, such as VORANOL 8000LM, VORANOL 230-238, VORANOL 4000LM, VORANOL 1010L, and VORANOL 230-660; TERCAROL™; and VORATEC™; as well as Polyglycol P2000 and Polyglycol P425, all available from the DOWDUPONT LLC, among other commercially available polyols.

The polyol can be from 25 to 95 parts of the isocyanate reactive composition based upon 100 parts of a combination of polyol and the tris(4-hydroxyphenyl)methane alkoxylate. All individual values and subranges from 25 to 95 parts are included; for example, the polyol can be from a lower limit of 25, 35, or 45 parts of the isocyanate reactive composition based upon 100 parts of a combination of the polyol and the tris(4-hydroxyphenyl)methane alkoxylate to an upper limit of 95, 85, or 75 parts of the isocyanate reactive composition based upon 100 parts of the combination of the polyol and the tris(4-hydroxyphenyl)methane alkoxylate.

The isocyanate reactive composition disclosed herein can include an isocyanate. The isocyanate may react with one or more components of the isocyanate reactive composition to form a cured product, e.g. a plaque, a foam, a film, a molded article, or a sheet. The isocyanate may be a polyisocyanate. As used herein, "polyisocyanate" refers to a molecule having an average of greater than 1.0 isocyanate groups/molecule, e.g. an average functionality of greater than 1.0.

The isocyanate may be an aliphatic polyisocyanate, a cycloaliphatic polyisocyanate, an arylaliphatic polyisocyanate, an aromatic polyisocyanate, or combinations thereof, for example. Examples of isocyanates include, but are not limited to, polymethylene polyphenylisocyanate, toluene 2,4-/2,6-diisocyanate (TDI), methylenediphenyl diisocyanate (MDI), polymeric MDI, triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, and combinations thereof, among others. As well as the isocyanates mentioned above, partially modified polyisocyanates including uretdione, isocyanurate, carbodiimide, uretonimine, allophanate or biuret structure, and combinations thereof, among others, may be utilized.

The isocyanate may be polymeric. As used herein "polymeric", in describing the isocyanate, refers to higher molecular weight homologues and/or isomers. For instance, polymeric methylene diphenyl isocyanate refers to a higher molecular weight homologue and/or an isomer of methylene diphenyl isocyanate.

As mentioned, the isocyanate may have an average functionality of greater than 1.0 isocyanate groups/molecule. For instance, the isocyanate may have an average functionality from 1.75 to 3.50. All individual values and subranges from 1.75 to 3.50 are included; for example, the isocyanate may have an average functionality from a lower limit of 1.75, 1.85, or 1.95 to an upper limit of 3.50, 3.40 or 3.30.

The isocyanate may have an isocyanate equivalent weight 80 g/eq to 300 g/eq. All individual values and subranges from 80 to 300 g/eq are included; for example, the isocyanate may have an isocyanate equivalent weight from a lower limit of 80, 90, 100, 125, 135, or 145 to an upper limit of 300, 290, 285, or 280 g/eq.

The isocyanate may be prepared by a known process. For instance, the polyisocyanate may be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example.

The isocyanate may be obtained commercially. Examples of commercial isocyanates include, but are not limited to, polyisocyanates under the trade names VORANATE™, PAPI™, VORATEC™, and ISONATE™, such as VORANATE M 220, PAPI 580N, and PAPI 27, available from DOWDUPONT LLC, among other commercial isocyanates.

The isocyanate may be from 50 to 500 parts of the isocyanate reactive composition based upon 100 parts of a combination of the polyol and the tris(4-hydroxyphenyl)methane alkoxylate. All individual values and subranges from 50 to 500 parts are included; for example, the isocyanate may be from a lower limit of 50, 60, 70, 80, 100, 110, 125, or 140 parts to an upper limit of 500, 450, 400, 350, 300, 275, 250, 225, 215, 200, or 180 parts of the isocyanate reactive composition based upon 100 parts of a combination of the polyol and the tris(4-hydroxyphenyl)methane alkoxylate.

The isocyanate may be utilized such that isocyanate-reactive components of the isocyanate reactive composition may be reacted with isocyanate components at an isocyanate index from 80 to 600. For instance, isocyanate-reactive components of the isocyanate reactive composition may be reacted with the isocyanate at an isocyanate index from a lower limit of 80, 85, 90, or 95 to an upper limit of 600, 500, 400, 300, 250, 180, or 150. The isocyanate index may be determined as equivalents of isocyanate divided by the total equivalents of isocyanate-reactive components of the isocyanate reactive composition, e.g., isocyanate-reactive hydrogen, multiplied by 100. In other words, the isocyanate index can be determined as a ratio of isocyanate-groups to isocyanate-reactive hydrogen, given as a percentage.

One or more embodiments of the present disclosure provide that the isocyanate index may be from 100 to 150, e.g., for rigid foam applications. All individual values and subranges from 100 to 150 are included; for example, the isocyanate index may be from a lower limit of 100, 103, 105, or 110 to an upper limit of 150, 140, 130, or 125.

The isocyanate reactive compositions disclosed herein can include a catalyst. Different catalysts may be utilized for various applications. The catalyst may be a blowing catalyst, a gelling catalyst, a trimerization catalyst, or a combination thereof. As used herein, blowing catalysts and gelling catalysts may be differentiated by a tendency to favor either the urea (blow) reaction, in the case of the blowing catalyst, or the urethane (gel) reaction, in the case of the gelling catalyst. A trimerization catalyst may be utilized to promote the isocyanurate reaction in the compositions.

Examples of blowing catalysts, e.g., catalysts that may tend to favor the blowing reaction include, but are not limited to, short chain tertiary amines or tertiary amines containing an oxygen. The amine based catalyst may not be sterically hindered. For instance, blowing catalysts include bis-(2-dimethylaminoethyl)ether; pentamethyldiethylenetriamine, triethylamine, tributyl amine, N,N-dimethylaminopropylamine, dimethylethanolamine, N,N,N',N'-tetramethylethylenediamine, and combinations thereof, among others. An example of a commercial blowing catalyst is POLYCAT 5, from Evonik, among other commercially available blowing catalysts.

Examples of gelling catalysts, e.g., catalyst that may tend to favor the gel reaction, include, but are not limited to, organometallic compounds, cyclic tertiary amines and/or long chain amines, e.g., that contain several nitrogen atoms, and combinations thereof. Organometallic compounds include organotin compounds, such as tin(II) salts of organic carboxylic acids, e.g., tin(II) diacetate, tin(II) dioctanoate, tin(II) diethylhexanoate, and tin(II) dilaurate, and dialkyltin (IV) salts of organic carboxylic acids, e.g., dibutyltin diacetate, dibutyltin dilaurate, dibutyltin maleate and dioctyltin diacetate. Bismuth salts of organic carboxylic acids may also be utilized as the gelling catalyst, such as, for example, bismuth octanoate. Cyclic tertiary amines and/or long chain amines include dimethylbenzylamine, triethylenediamine, and combinations thereof, and combinations thereof. Examples of a commercially available gelling catalysts are POLYCAT 8, DABCO EG, and DABCO T-12 from Evonik, among other commercially available gelling catalysts.

Examples of trimerization catalysts include PMDETA-N, N,N',N'',N''-pentamethyldiethylenetriamine; N,N',N''-Tris (3-dimethylaminopropyl)hexahydro-S-triazine; N,N-dimethylcyclo-hexylamine; 1,3,5-tris(N,N- dimethylaminopropyl)-s-hexahydrotriazine; [2,4,6-Tris (dimethylaminomethyl) phenol]; potassium acetate, potassium octoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, combinations thereof, among others. Some commercially available trimerization catalysts include DABCO TMR-2, TMR-7, DABCO K 2097; DABCO K15, POLYCAT 41, and POLYCAT 46, each from Evonik, among other commercially available trimerization catalysts.

The catalyst may be from 0.05 to 10.0 parts of the isocyanate reactive composition based upon 100 parts of a combination of the polyol and the tris(4 hydroxyphenyl) methane alkoxylate. All individual values and subranges from 0.05 to 10.0 parts are included; for example, the catalyst may be from a lower limit of 0.05, 0.07, 0.1, 0.2, or 0.3 parts to an upper limit of 10.0, 9.0, 8.0, 7.0, 6.0, 5.0, 4.5, 4.0, 3.5, 3.4, or 3.3 parts of the isocyanate reactive composition based upon 100 parts of the combination of the polyol and the tris(4-hydroxyphenyl)methane alkoxylate.

Embodiments of the present disclosure provide that the isocyanate reactive composition may include a blowing agent. The blowing agent may be a physical blowing agent, a chemical blowing agent, or combinations thereof.

Examples of physical blowing agents include liquid carbon dioxide; ketones, such as acetone; esters; aldehydes; alkanes; cycloalkanes, such as, cyclopentane, cyclohexane, cyclobutane and mixtures thereof; other cycloalkanes having up to 7 carbon atoms; ethers, such as dialkyl ethers, cycloalkylene ethers, fluoroalkanes, hydrofluoroolefins, hydrochlorofluoroolefins, and mixtures thereof. Examples of alkanes include, but are not limited to, propane, butane, n-butane, isobutane, n-pentane, isopentane and combinations thereof. Examples of dialkyl ethers include dimethyl ether, methyl ethyl ether, methyl butyl ether, diethyl ether, and combinations thereof. An example of a cycloalkylene ether is furan. Examples of fluoroalkanes include, but are not limited to, pentafluoropropane, trifluoromethane, difluoromethane, difluoroethane, tetrafluoroethane, hepta-fluoropropane, pentafluorobutane, heptafluorobutane, and combinations thereof, among others. Examples of hydrofluoroolefins and/or hydrochlorofluoroolefins include, but are not limited to 1,1,1,4,4,5,5,5-octafluoro-2-pentene (HFC-1438mzz), Z-1,1,1,4,4,4-hexafluoro-2-butene (HFC-1336mzz, Z-isomer), trans-1,3,3,3-tetrafluoropropene, 1-chloro-3,3,3-trifluoropropene (HFO-1233zd). One or more embodiments provide that trans-1-chloro-3,3,3-trifluoropropene is utilized. An example of a commercially available physical blowing agents is Solstice 1233zd Liquid Blowing Agent from Honeywell, among other commercially available physical blowing agents.

Examples of chemical blowing agents include, but are not limited to, water, formic acid, methyl formate, $CO_2$ generating materials, and combinations thereof.

The blowing agent may be from 1.0 to 50.0 parts of the isocyanate reactive composition based upon 100 parts of a combination of the polyol and the tris(4-hydroxyphenyl) methane alkoxylate. All individual values and subranges from 1.0 to 50.0 parts are included; for example, the blowing agent may be from a lower limit of 1.0, 1.5, or 2.0 parts to an upper limit of 50.0, 45.0, 43.0, 40.0, or 38.0 parts of the isocyanate reactive composition based upon 100 parts of the combination of the polyol and the tris(4-hydroxyphenyl) methane alkoxylate.

The isocyanate reactive composition may include a surfactant. The surfactant may be a cell-stabilizing surfactant, for instance. Examples of surfactants include silicon-based compounds such as organosilicone-polyether copolymers, such as polydimethylsiloxane-polyoxyalkylene block copolymers, e.g., polyether modified polydimethyl siloxane, and combinations thereof. Examples of surfactants include non-silicone based organic surfactants such as VORASURF™ 504, available from The Dow Chemical Company. Surfactants are available commercially and include those available under trade names such as NIAX, such as NIAX L 6988; DABCO; and TEGOSTAB, such as TEGOSTAB B 8462; among others.

The surfactant may be from 0.1 to 10.0 parts of the isocyanate reactive composition based upon 100 parts of a combination of the polyol and the tris(4-hydroxyphenyl) methane alkoxylate. All individual values and subranges from 0.1 to 10.0 parts are included; for example, the surfactant may be from a lower limit of 0.1, 0.2, or 0.3 parts to an upper limit of 10.0, 9.0, 8.0, 7.0, 6.0, 5.0, 4.0, or 3.0 parts of the isocyanate reactive composition based upon 100 parts of a combination of the polyol and the tris(4-hydroxyphenyl)methane alkoxylate.

One or more embodiments of the present disclosure provide that the isocyanate reactive composition may include one or more additional components e.g., additional components known in the art. Examples of additional components include cell compatibilizing agents, additional crosslinkers, toughening agents, flow modifiers, viscosity modifiers, reactivity modifiers, solvents, carriers, adhesion promoters, diluents, stabilizers, plasticizers, catalyst de-activators, flame retardants, inorganic fillers, smoke suppression agents, liquid nucleating agents, solid nucleating agents, Ostwald ripening retardation additives, pigments, colorants, chain extenders, antioxidants, biocide agents, and combinations thereof, among others known in the art. Different additional components and/or different amounts of the additional components may be utilized for various applications.

The isocyanate reactive compositions disclosed herein may be cured, e.g., the isocyanate may be reacted with one or more components of the isocyanate reactive composition, to form a cured product. The cured product may be a plaque, a foam, a film, a molded article, or a sheet, for example. The cured product may be prepared using known methods, equipment, and conditions, which may vary for different applications.

One or more embodiments of the present disclosure provide that the cured product is a plaque, e.g., a molded plaque. The plaques disclosed herein may have a combination of properties that are desirable for a number of applications. For instance, the plaques disclosed herein may advantageously provide desirable limiting oxygen indexes, while also providing desirable glass transition temperatures.

The plaques disclosed herein may have a limiting oxygen index greater than 24%. For example, the plaque may have a limiting oxygen index from 24% to 27%. All individual values and subranges from 24% to 27% are included; for example, the plaque may have a limiting oxygen index from a lower limit of 24.0, 24.2, or 24.3% to an upper limit of 27.0, 26.5, or 26.0%. Limiting oxygen index may be determined according to ASTM D2863.

The plaques disclosed herein may have a glass transition temperature of at least 60° C. For example, the plaque may have a glass transition temperature from 60° C. to 150° C. All individual values and subranges from 60° C. to 150° C. are included; for example, the plaque may have a glass transition temperature from a lower limit of 60° C. to an upper limit of 150, 135, 120, 115, 90, 85, or 80° C. Glass transition temperature may be determined by dynamic mechanical analysis at a temperature ramp rate of 3° C./min and an oscillatory frequency of 6.28 rad/sec according to ASTM E1640.

The plaques disclosed herein may have a TGA char yield at 700° C. from 22% to 50%. All individual values and subranges from 22% to 50% are included; for example, the plaque may have a TGA char yield at 700° C. from a lower limit of 22, 23, or 24% to an upper limit of 50, 40, 30, 28, 27, or 26%. TGA char yield at 700° C. may be determined as a residual weight present at 700° C. For instance, plaques may be subjected to a temperature profile of 25° C. to 700° C. at a ramp rate 50° C./min under an atmosphere of nitrogen to generate data for TGA char yield measurement.

One or more embodiments of the present disclosure provide that the cured product is a foam. The foams disclosed herein may have one or more properties that are desirable for a number of applications.

The foams disclosed herein may have a peak heat release rate less than 130 kW/m$^2$. For example, the foam may have a peak heat release rate from 50 to 128 kW/m$^2$. All individual values and subranges from 50 to 128 kW/m$^2$ are included; for example, the foam may have a peak heat release rate from a lower limit of 50, 60, 75, 85, 95, 110, 112, or 115 kW/m$^2$ to an upper limit of 128, 127, or 126 kW/m$^2$. Peak heat release rate may be determined according to ASTM E1354.

The foams disclosed herein may have a total heat release less than 19.5 MJ/m$^2$. For example, the foam may have a total heat release from 5 to 19 MJ/m$^2$. All individual values and subranges from 5 to 19 MJ/m$^2$ are included; for example, the foam may have a total heat release from a lower limit of 5, 6, 7, 8, 10, 12, or 14 MJ/m$^2$ to an upper limit of 19, 18, or 17 MJ/m$^2$. Total heat release rate may be determined according to ASTM E1354.

The foams disclosed herein may have a total mass loss (%) less than 60%. For example, the foam may have a total mass loss from 25 to 58%. All individual values and subranges from 25 to 58% are included; for example, the foam may have a total mass loss from a lower limit of 25, 30, 35, 40, 45, or 50% to an upper limit of 58, 57, or 56%. Total mass loss may be determined according to ASTM E1354.

The foams disclosed herein may have a total smoke release from 100 to 350 m$^2$/m$^2$. All individual values and subranges from 100 to 350 m$^2$/m$^2$ are included; for example, the foam may have a total smoke release from a lower limit of 100, 125, or 150 m$^2$/m$^2$ to an upper limit of 350, 325, or 300 m$^2$/m$^2$. Total smoke release may be determined according to ASTM E1354.

The foams disclosed herein may have a total smoke production from 0.5 to 3.5 m$^2$. All individual values and subranges from 0.5 to 3.5 m$^2$ are included; for example, the foam may have a total smoke production from a lower limit of 0.5, 0.75, or 1.0 m$^2$ to an upper limit of 3.5, 3.0, or 2.0 m$^2$. Total smoke production may be determined according to ASTM E1354.

The foams disclosed herein may have a molded foam density from 20.0 to 45.0 kilograms per cubic meter (kg/m$^3$). All individual values and subranges from 20.0 to 45.0 kg/m$^3$ are included; for example, the foam may have a molded foam density from a lower limit of 20.0, 22.0, 25.0, 27.0, 27.2, 27.5, 28.0, 28.5, or 29.0 kg/m$^3$ to an upper limit of 45.0, 43.0, 42.0, 40.0 kg/m$^3$. Foams having such molded foam densities are highly desirable for a number of applications, e.g., insulated panels and spray foams, among others.

The foams disclosed herein may have a compressive strength from 130 to 180 kPa. All individual values and subranges from 130 to 180 kPa are included; for example, the foam may have a compressive strength from a lower limit of 130, 135, 140, or 145 kPa to an upper limit of 180, 175, 170, or 165 kPa. Compressive strength may be determined according to ASTM D1621.

The foams disclosed herein may have a K factor at 24° C. from 18 to 22 mW/m$^2$*K. All individual values and subranges from 18 to 22 mW/m$^2$*K are included; for example, the foam may have a K factor at 24° C. from a lower limit of 18, 18.5, or 19 mW/m$^2$*K to an upper limit of 22, 21.5, or 21 mW/m$^2$*K. K factor at 24° C. may be determined according to ASTM C518.

EXAMPLES

In the Examples, various terms and designations for materials are used including, for instance, the following:

Polyester polyol A (aromatic polyester polyol; prepared from polyethylene glycol, glycerin, diethylene glycol, and terephthalic acid; average hydroxyl number 230 mg KOH/g; OH functionality of 2.1, aromatic content of 15 wt %);

VORANOL IP 625 (polyether polyol; average hydroxyl functionality 3.0; average hydroxyl number 270 mg KOH/g; number average molecular weight 623 g/mol; obtained from DOWDUPONT LLC);

BPA ethoxylate (ethoxylate of bisphenol A; hydroxyl number 220-235 mg KOH/g; obtained from Sigma-Aldrich);

DABCO K 2097 (trimerization catalyst; obtained from Evonik);

DABCO EG (gelling catalyst; obtained from Evonik);

POLYCAT 5 (blowing catalyst; obtained from Evonik);

Triethyl phosphate (flame retardant; obtained from Sigma-Aldrich);

PAPI 580N (isocyanate; polymethylene polyphenylisocyanate that contains MDI and has a NCO content of approximately 30.8 wt % and isocyanate equivalent molecular weight of 136.5; obtained from DOWDUPONT LLC);

Silicone Polyether Surfactant (surfactant; obtained from Evonik);

Cyclopentane (physical blowing agent; obtained from Sigma-Aldrich).

Commercial polyols were dried under a nitrogen stream to provide water levels were less than 500 ppm as determined with a Karl-Fischer titrator. Other materials were utilized as received.

Tris(4-hydroxyphenyl)methane ethoxylate (TPM ethoxylate) was prepared as follows. 4,4',4"-trihydroxytriphenylmethane (8.0 g, 26.82 mmol), 2-(2-(2-chloroethoxy)ethoxy)ethan-1-ol (18.0 g, 107.27 mmol), potassium carbonate (16.68 g, 120.69 mmol), and potassium iodide (2.3 g, 13.4 mmol) in 100 mL of DMF were added to a container; the contents of the containers were heated to 110° C. and maintained at that temperature for approximately 48 hours. Thereafter the contents of the container were concentrated under reduced pressure and the resultant residue was diluted with water and extracted with ethyl acetate (200 mL). The organic layer was washed with water and concentrated under reduced pressure to provide a dark oil was purified by chromatography on silica gel using an ISCO flash chromatography system with methanol:ethyl acetate (80 to 100%) as eluent to provide the TPM Ethoxylate (8.74 g; Yield of 47%).

Example 1, an isocyanate reactive composition, was prepared as follows. TPM ethoxylate and polyol were added to a container. Various respective amounts of TPM ethoxylate and polyol were utilized. The respective amounts, i.e. TPM ethoxylate of 50, 25, and 10, that were utilized for each of the three specimens of Example 1, are reported in Table 1.

Examples 2-4, isocyanate reactive compositions, were prepared by adding DABCO EG to each of the respective three specimens of Example 1. The contents of the respective containers were mixed with a Flacktek speedmixer at 3500 rpm for approximately 1 minute. Thereafter, PAPI 580N was added to each of the respective containers and the contents were mixed with the Flacktek speedmixer at 3500 rpm for approximately 1 minute. The respective amounts that were utilized are reported in Table 1; the amounts are based upon 100 parts of a combination of the polyol and the tris(4-hydroxyphenyl)methane ethoxylate. The reported aromatic group content for Examples 2-4 was based upon a total weight of the polyol and the tris(4-hydroxyphenyl)methane alkoxylate.

After mixing, each of the three containers was transferred to a standing vertical mold to form Examples 5-7, cured products, i.e. plaques. The standing vertical mold had been preheated to 60° C. The contents of the standing vertical mold cured in an oven that was maintained at 60° C. for 60 minutes. Then the products were demolded and post-cured in an oven that was maintained at 100° C. for 60 minutes and thereafter cooled to room temperature.

The standing vertical mold comprised a steel panel (20 cm×20 cm×2.5 cm) that was fitted with a sheet of PTFE-coated aluminum (20 cm×20 cm×0.06 cm). A steel U-shaped spacer (18.5 cm×16.5 cm×0.4 cm) was placed on top of the PTFE-coated aluminum sheet. A piece of silicon tubing (diameter of approximately 1 cm) was then set to cover the inner perimeter of the U-shaped spacer. An additional PTFE-coated aluminum sheet and steel panel were subsequently placed on top of the apparatus to complete the mold's layered structure. The mold was held together using four metal C-clamps.

Comparative Examples (CE) A-G were prepared as Examples 2-4, with the change that the items and/or amounts listed in Table 2 were utilized rather than the items listed in Table 1; the amounts are based upon 100 parts of a combination of the polyol and the BPA ethoxylate. Comparative Examples H-N were prepared as Examples 5-7, with the change that Comparative Examples A-G were utilized rather than Example 2-4. The reported aromatic group content for Comparative Examples A-G was based upon a total weight of the polyol and the BPA ethoxylate.

A number of properties were determined for Examples 5-7 and Comparative Examples H-N. Limiting oxygen index (LOI) was determined according to ASTM D2863. A bundle of 10 samples (each sample was 100 mm×10 mm×40 mm) was prepared with a water jet cutter for each of the cured products. Glass transition temperature (Tg) was determined by dynamic mechanical analysis at a temperature ramp rate of 3° C./min and an oscillatory frequency of 6.28 rad/sec according to ASTM E1640. Thermogravimetric analysis (TGA) data was collected under a nitrogen atmosphere over a temperature range of 25° C. to 700° C. utilizing a ramp rate of 50° C./minute; char yield at 700° C. represents the residual mass (wt %) measured at 700° C. of the plotted TGA data. The results are reported in Tables 1 and 2.

TABLE 1

|  | Example 2 | Example 3 | Example 4 |
|---|---|---|---|
| TPM ethoxylate | 50 parts | 25 parts | 10 parts |
| Polyester polyol A | 50 parts | 75 parts | 90 parts |
| VORANOL IP 625 | — | — | — |
| BPA ethoxylate | — | — | — |
| DABCO EG | 0.1 parts | 0.1 parts | 0.1 parts |
| PAPI 580N | 60 parts | 60 parts | 60 parts |
| Isocyanate index | 100 | 100 | 100 |
| Aromatic group content (wt %) | 23 | 20 | 17 |

| Cured product properties | | | |
|---|---|---|---|
|  | Example 5 | Example 6 | Example 7 |
| LOI (%) | 25.2 | 24.5 | 24.3 |
| Tg ° C. | 76 | 62 | 60 |
| TGA Char yield at 700° C. (wt %) | 26 | 24 | 25 |

TABLE 2

|  | CE A | CE B | CE C | CE D | CE E | CE F | CE G |
|---|---|---|---|---|---|---|---|
| TPM ethoxylate | — | — | — | — | — | — | — |
| Polyester polyol A | 50 parts | 75 parts | 90 parts | 40 parts | 50 parts | 75 parts | 90 parts |
| VORANOL IP 625 | 50 parts | 25 parts | 10 parts | — | — | — | — |
| BPA ethoxylate | — | — | — | 60 parts | 50 parts | 25 parts | 10 parts |
| DABCO EG | 0.1 parts | 0.1 parts | 0.1 parts | 0.1 parts | 0.1 parts | 0.1 parts | 0.1 parts |
| PAPI 580N | 63 parts | 61 parts | 60 parts | 58 parts | 58 parts | 59 parts | 59 parts |
| Isocyanate index | 100 | 100 | 100 | 100 | 100 | 100 | 100 |
| Aromatic group content | 8 | 11 | 14 | 23 | 23 | 19 | 17 |

TABLE 2-continued (wt %)

| | Cured product properties | | | | | | |
|---|---|---|---|---|---|---|---|
| | CE H | CE I | CE J | CE K | CE L | CE M | CE N |
| LOI (%) | 25.8 | 24.9 | 24.3 | 22.7 | 24.0 | 24.5 | 24.2 |
| Tg °C. | 35 | 50 | 55 | 62 | 60 | 59 | 55 |
| TGA Char yield at 700° C. (wt %) | 27 | 28 | 27 | 24 | 21 | 28 | 27 |

The data of Tables 1 and 2 show that each of Examples 5-7 advantageously had both a limiting oxygen index greater than 24% and a glass transition temperature of at least 60° C. In contrast to Examples 5-7, none of Comparative Examples H-N had both a limiting oxygen index greater than 24% and a glass transition temperature of at least 60° C.

Example 8, an isocyanate reactive composition, was prepared as follows. TPM ethoxylate and polyol were added to a container. The reported aromatic group content for Example 8 was based upon a total weight of the polyol and the tris(4-hydroxyphenyl)methane alkoxylate.

Example 9 was formed by adding the components indicated in Table 3, except for PAPI 580N, to the container and mixing the contents of the container to homogenize. The amounts shown in Table 3 are based upon 100 parts of a combination of the polyol and the tris(4-hydroxyphenyl) methane ethoxylate. Thereafter, the PAPI 580N was added to the container and the contents of the container were mixed with an overhead mixer at approximately 2500 rpm for 5 seconds. The mixture was then poured into a preheated (54° C.) mold to form Example 10, a cured product, i.e. a foam. The size of the mold was 5 cm×20 cm×30 cm. The mold was positioned vertically along the mold's length direction for foaming. The lid to the mold was closed and the mold was maintained at 54° C. for 15 minutes. Thereafter, Example 10 was removed from the mold.

Comparative Examples O-Q were prepared as Example 9, with the change that the items and/or amounts listed in Table 3 were utilized. The reported aromatic group content for Comparative Examples O-Q was based upon a total weight of the polyol and the BPA ethoxylate. Comparative Examples R-T were prepared as Example 10, with the change that Comparative Examples O-Q were utilized rather than Example 9.

A number of properties were determined for Example 10 and Comparative Examples R-T. Foam core density was determined according to ASTM D1622. Compressive strength was determined according to ASTM D1621. K factor at 24° C. was determined according to ASTM C518. Peak heat release rate; total heat release; mass loss; total smoke release; and total smoke production were determined according to ASTM E1354.

TABLE 3

| | Example 9 | CE O | CE P | CE Q |
|---|---|---|---|---|
| TPM ethoxylate | 42 parts | — | — | — |
| Polyester polyol | 58 parts | 58 parts | 40 parts | 58 parts |
| VORANOL IP 625 | — | 42 parts | — | — |
| BPA ethoxylate | — | — | 60 parts | 42 parts |
| Water | 0.8 parts | 0.8 parts | 0.8 parts | 0.8 parts |
| SPE surfactant | 3 parts | 3 parts | 3 parts | 3 parts |
| DABCO K 2097 | 2.1 parts | 2.1 parts | 2.1 parts | 2.1 parts |
| POLYCAT 5 | 1.2 parts | 1.2 parts | 1.2 parts | 1.2 parts |
| Triethyl phosphate | 13.80 parts | 14.16 parts | 13.53 parts | 13.61 parts |
| Cyclopentane | 18.27 parts | 18.86 parts | 17.94 parts | 18.04 parts |
| PAPI 580N | 252 parts | 261 parts | 245 parts | 247 parts |
| Isocyanate index | 350 | 350 | 350 | 350 |
| Aromatic group content (wt %) | 23 | 9 | 25 | 22 |

| | Cured product properties | | | |
|---|---|---|---|---|
| | Example 10 | CE R | CE S | CE T |
| Density (kg/m³) | 37.0 | 39.4 | 38.8 | 39.6 |
| Compressive strength (kPa) | 155 | 147 | 128 | 167 |
| K factor at 24° C. (mW/m²*K) | 20.38 | 20.22 | 20.46 | 20.35 |
| Peak heat release rate (kW/m²) | 122 | 130 | 140 | 138 |
| Total heat release (MJ/m²) | 16.3 | 24.5 | 23.0 | 19.9 |
| Mass loss (%) | 58 | 68 | 79 | 60 |
| Total smoke release (m²/m²) | 208 | 166 | 385 | 302 |
| Total smoke production (m²) | 1.84 | 1.29 | 3.41 | 2.67 |

The data of Table 3 show that Example 10 has an improved, i.e. lower, peak heat release rate as compared to each of Comparative Examples R-T. Further, the data of Table 3 show that Example 10 has an improved, i.e. lower, total heat release as compared to each of Comparative Examples R-T. Additionally, the data of Table 3 show that Example 10 has an improved, i.e. lower, mass loss as compared to each of Comparative Examples R-T.

What is claimed is:
1. An isocyanate reactive composition comprising:
   a polyol; and
   tris (4-hydroxyphenyl) methane alkoxylate, wherein the polyol is from 25 to 95 parts of the isocyanate reactive composition based upon 100 parts of a combination of the polyol and the tris (4-hydroxyphenyl) methane alkoxylate, and the tris (4-hydroxyphenyl) methane alkoxylate is from 5 to 75 parts of the isocyanate reactive composition based upon 100 parts of the combination of the polyol and the tris (4-hydroxyphenyl) methane alkoxylate.

2. The isocyanate reactive composition of claim 1, wherein the polyol is a polyester polyol, a polyether polyol, a polycarbonate polyol, or a combination thereof.

3. The isocyanate reactive composition of claim 1, wherein the isocyanate reactive composition has an aromatic group content from 10 to 35 weight percent based upon a total weight of the polyol and the tris (4-hydroxyphenyl) methane alkoxylate.

* * * * *